Figure 1:
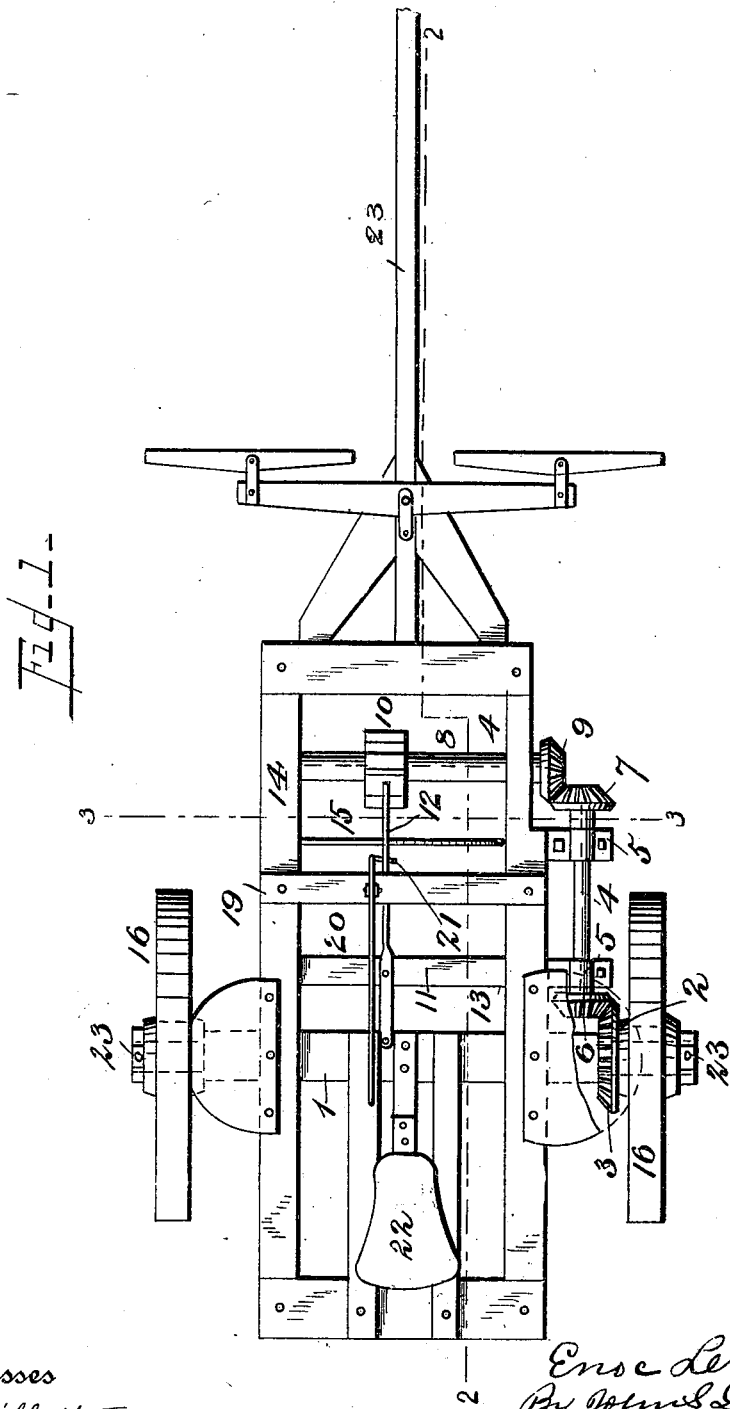

No. 665,236. Patented Jan. 1, 1901.
E. LEVINGS.
COTTON CHOPPER.
(Application filed Aug. 10, 1900.)
(No Model.) 2 Sheets—Sheet 1.

Witnesses
C. Gillette
L. H. Windsor.

Inventor
Enoc Levings
By James Duffie
Attorney

No. 665,236. Patented Jan. 1, 1901.
E. LEVINGS.
COTTON CHOPPER.
(Application filed Aug. 10, 1900.)
(No Model.) 2 Sheets—Sheet 2.
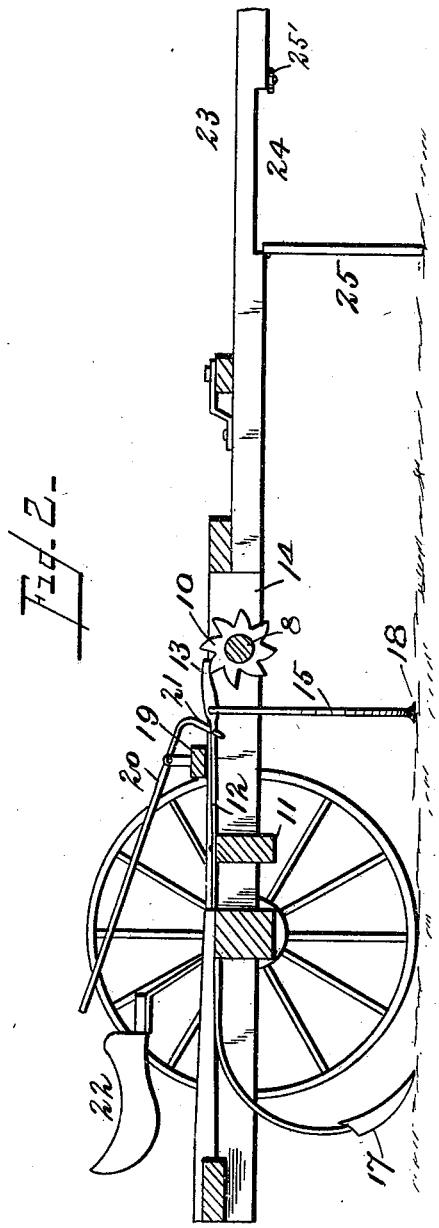
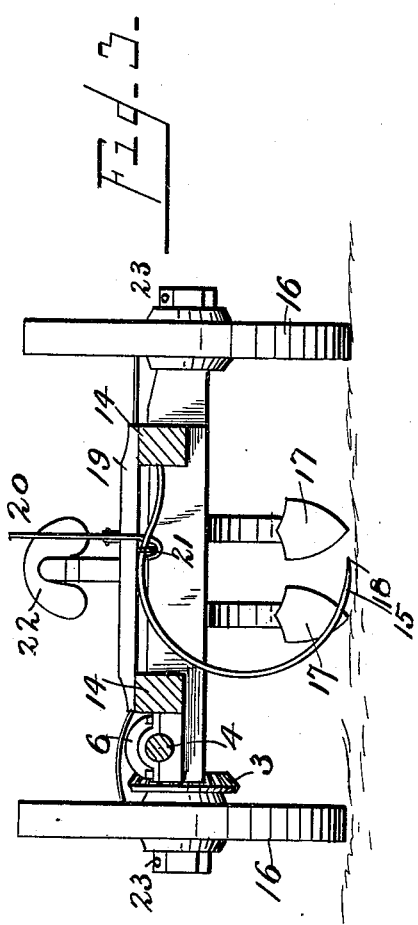
Witnesses
C. Gillette
L. H. Windsor
Inventor
Enoc Levings
By John S. Duffie
Attorney

UNITED STATES PATENT OFFICE.

ENOC LEVINGS, OF COLMESNEIL, TEXAS, ASSIGNOR OF ONE-HALF TO JESSE N. COLLIER AND CHARLES D. CRAWFORD, OF SAME PLACE.

COTTON-CHOPPER.

SPECIFICATION forming part of Letters Patent No. 665,236, dated January 1, 1901.

Application filed August 10, 1900. Serial No. 26,476. (No model.)

*To all whom it may concern:*

Be it known that I, ENOC LEVINGS, a citizen of the United States, residing at Colmesneil, in the county of Tyler and State of Texas, have invented certain new and useful Improvements in Cotton-Choppers; and I do hereby declare the following to be a full, clear, and exact description of the invention, such as will enable others skilled in the art to which it appertains to make and use the same.

My invention is a cotton-chopper; and it consists of a two-wheeled carriage having a hoe situated to thin the cotton and is operated by bevel gear-wheels, a ratchet-wheel, and a spring.

In the accompanying drawings, Figure 1 is a top plan view of my invention. Fig. 2 is a longitudinal vertical sectional view of Fig. 1. Fig. 3 is a cross-sectional view of the machine.

My invention is described as follows:

1 is the axle. The hub 2 on the right side carries on its inner end a bevel gear-wheel 3. A shaft 4 is longitudinally journaled in bearings 5, which are securely attached to the carriage. On each end of said shaft 4 are rigidly secured bevel gear-wheels 6 and 7. The bevel gear-wheels 3 and 6 are protected by a heavy piece of tin, which is rigidly secured to the frame and extends almost over to the spokes of the wheel.

Running transversely and journaled between the side beam of the frame and near the forward end thereof is a shaft 8. On the right-hand end of said shaft is rigidly secured a gear-wheel 9, and near the center of said shaft is rigidly secured a ratchet-wheel 10. Secured to one of the cross-pieces 11 of the frame is a spring-rod 12. Its front end 13 is flattened and adapted to be moved up and down by said ratchet-wheel 10, and to the left-hand beam of the frame is secured one end of a spring 15. This spring passes through the spring-rod 12 and is curved downwardly and inwardly until it is just midway between the two shovel-plows 17. To the lower end of this spring-rod is secured a hoe 18, adapted to thin out the cotton. These shovel-plows 17 are adapted to hill up the cotton after it is cut by the hoe 18.

Fulcrumed on a cross-piece 19, secured on the upper faces of the side beams, is a lever 20. Its front end turns down and then is formed into a hook 21, which rests under the spring-rod 12. The rear end of this lever extends backward far enough so that it can be pressed down by the foot of the driver, who sits on the seat 22. In each of the hubs and near their outer ends is a perforation filled by a screw-plug 23, so that the spindle of the axle may be conveniently oiled.

My invention is operated as follows: As the coach moves forward the gear-wheels 6 and 7 operate the gear-wheel 9, and thereby rotate the shaft 8 and the ratchet-wheel 10. This in turn operates the spring-rod 12, causing it to move up and down. The spring then in turn operates the spring-rod 15, causing the hoe 18 to move rapidly to the right and left, cutting out a bunch of cotton at each lick, thus thinning it to a stand.

In turning the machine at the ends of the rows or moving it from place to place the operator presses down the rear end of the lever 20, and this raises the hoe from the ground.

Near the rear end of the tongue 23 and on the under side thereof is a recess 24, and hinged in this recess 24 is a drop-arm 25 for the tongue to rest on when the machine is at rest. When the machine is not in operation, this arm is held up by a thumb-screw 25'.

Having described my invention, what I claim as new, and desire to secure by Letters Patent, is—

1. In a cotton-chopper, the combination of a rectangular frame mounted on an axle; wheels journaled on said axle; a bevel gear-wheel secured to one of the hubs; a shaft longitudinally journaled to one side of rectangular frame; a bevel gear-wheel rigidly secured on the rear end of said shaft; said bevel gear-wheel meshing with the gear-wheel on the hub; a bevel gear-wheel rigidly secured on front end of said shaft; a shaft transversely journaled in the front end of the frame; a bevel gear-wheel rigidly secured on one end of said shaft and meshing with the gear-wheel secured on the front end of the side shaft; a ratchet-wheel rigidly secured on the transverse shaft; a spring-rod, its rear end secured to the frame and its front end adapted to be moved up and down by said ratchet-wheel; a bowed spring-rod, one end attached to said frame, the other carrying a hoe and adapted to be moved to the right and left by said spring, substantially as shown and described and for the purposes set forth.

2. In a cotton-chopper, the combination of a rectangular frame mounted on an axle; wheels journaled on said axle; a bevel gear-wheel secured to one of the hubs; a shaft longitudinally journaled to one side of said frame; a bevel gear-wheel rigidly secured on the rear end of said shaft; said bevel gear-wheel meshing with the gear-wheel on the hub; a bevel gear-wheel rigidly secured on front end of said shaft; a shaft transversely journaled in the front end of the frame; a bevel gear-wheel rigidly secured on the front end of the side shaft; a ratchet-wheel rigidly secured on the transverse shaft; a spring-rod, its rear end secured to the frame and its front end adapted to be moved up and down by said ratchet-wheel; a bowed spring-rod one end attached to said frame, the other carrying a hoe and adapted to be moved to the right and left by said spring; a seat secured to the upper face of the frame; a lever fulcrumed above said spring-rod and adapted to throw the hoe out of contact with the ground; two plows secured to the rear end of the frame and a brace hinged to the lower face of the tongue, substantially as shown and described and for the purposes set forth.

In testimony whereof I affix my signature in presence of two witnesses.

ENOC LEVINGS.

Witnesses:
W. W. ROCK,
T. C. CREWS.